United States Patent [19]

Embree

[11] 4,269,167
[45] May 26, 1981

[54] CLOSED PRESSURIZED SOLAR HEATING SYSTEM WITH AUTOMATIC VALVELESS SOLAR COLLECTOR DRAIN-BACK

[76] Inventor: John M. Embree, Bee Brook Crossing, Washington Depot, Conn. 06794

[21] Appl. No.: 89,546

[22] Filed: Dec. 7, 1979

[51] Int. Cl.³ .......................... F24J 3/02; E03B 7/10
[52] U.S. Cl. .................................. 126/420; 126/400; 126/437; 137/59; 237/80
[58] Field of Search ............... 126/420, 434, 437, 400; 165/18; 137/59, 60, 61, 62; 237/80, 66

[56] References Cited

U.S. PATENT DOCUMENTS

| | | | |
|---|---|---|---|
| 2,469,496 | 5/1949 | Christenson | 126/437 |
| 3,799,145 | 3/1974 | Butterfield | 126/437 |
| 4,027,821 | 6/1977 | Hayes et al. | 126/400 |
| 4,044,754 | 8/1977 | Cronin et al. | 126/420 |
| 4,108,160 | 8/1978 | Harper | 126/420 |
| 4,119,087 | 10/1978 | Cook | 126/420 |
| 4,133,338 | 1/1979 | Honikman | 137/62 |
| 4,134,390 | 1/1979 | Rawal | 126/420 |
| 4,138,996 | 2/1979 | Cartland | 137/59 |
| 4,191,166 | 3/1980 | Saarem et al. | 137/59 |
| 4,207,866 | 6/1980 | Boyd | 126/437 |

OTHER PUBLICATIONS

Solar Heating Systems Design Manual, 1976, ITT Training & Education/Fluid Handling.

Primary Examiner—Daniel J. O'Connor

[57] ABSTRACT

A closed pressurized solar heating system in which a solar collector is automatically drained of heat transport fluid and which contains no mechanical moving parts other than a system circulating pump. Pipe lines connect the solar collector to top and bottom openings of a sump tank which is initially filled with the fluid, water, to a level intermediate between the top and bottom openings. The sump tank contains an internal pipe extending from the top opening of the tank down to below the operating level of the transport fluid, which is lower than the initial fill level because of the fluid required to fill the collector. Drain-back automatically commences upon de-energization of the system pump, whereupon air from the upper part of the sump tank enters a vent in the sump tank internal pipe, breaking the vacuum existing within the flow return path from the collector and initiating fluid return from the collector to the sump tank. The internal pipe is enclosed coaxially by a second pipe which captures any spill flow issuing from the vent and assuring quiet operation while the pump is energized. The internal sump tank pipe assembly is called the "Coaxial Hydro-vent".

12 Claims, 7 Drawing Figures

CLOSED PRESSURIZED SOLAR HEATING SYSTEM WITH AUTOMATIC VALVELESS SOLAR COLLECTOR DRAIN-BACK

BACKGROUND OF THE INVENTION

1. Field of the Invention

This invention relates to solar water heating systems, and more particularly to a closed solar heating system wherein an initial charge of water is retained permanently as the heat transport fluid, and which is provided with means to drain a solar collector during periods of cold temperature automatically and with no mechanical moving parts.

2. Description of the Prior Art

A major problem associated with solar heating systems involves the need to protect the solar collectors exposed to the environmental elements from the effects of cold temperatures. In particular, solar collectors are generally susceptible to rupture during periods of extreme cold when a fluid circulating through the collectors is likely to freeze within the collector unless preventive measures are taken.

One preventive measure suggested in the prior art is to add antifreeze to the collector circulating fluid in order to lower the freezing point of this fluid. Antifreeze, however, is not only expensive, but also can be poisonous and therefore represent a serious potential safety hazard. Exposure to heat can, over a period of time cause the antifreeze to deteriorate and become corrosive, with resultant damage to the piping within the solar system. Furthermore, although an antifreeze mixture does not freeze at lower temperatures, nevertheless the temperature of the mixture does drop to the low ambient temperature. Therefore substantial time is needed to heat the cold antifreeze mixture to a useable temperature as the solar environment of the collector improves.

It has therefore been desirable to protect solar collectors from fluid freezing by draining the collectors during periods of cold temperature. One such system, as disclosed in U.S. Pat. No. 4,044,754 to Cronin et al., employs drainage valves in piping below the level of the solar collector to drain the collector during periods of low temperature. Also provided at the highest point of the system is a vacuum-breaker valve which allows air to enter the water lines to facilitate drainage.

Another solar collector drainage system is disclosed in U.S. Pat. No. 4,027,821 to Hayes et al. wherein a vent line connects the top of the collector to a storage tank and provides an air passageway to the collector from the storage tank to enable drainage of the collector. The vent line is connected to the collector by means of a check-valve and a solenoid actuated valve to initiate drainage of the collector and the vent line. While the systems of the prior art generally provide effective drainage during normal operation, it is seen that they employ mechanically operated valves to initiate drainage. Unfortunately, valves of this type are prone to failure, especially at low temperature when their function is vital to protect the system. In that regard, it is noted that the flow passages of valves tend to be small and are likely to freeze due to condensation or minor back-dripping in the system, and valves are therefore believed to be inherently unreliable drainage components.

It is further noted the "open" drainage systems which utilize valving actuation to admit exterior air into the system during drainage, cannot be easily pressurized due to valve leakage, and therefor are to some extent susceptible to boiling and vaporization at operating temperatures normal to solar heating systems. Since vaporization is most likely to occur at the output of the solar collector, a hydraulic imbalance is created between the supply and return lines to the collector, thereby increasing the load to the system pump, which is also inclined to cavitation under these conditions, further compounding the problems resulting from valve leakage. Furthermore, the "open" system introduces fresh oxygen into the system during each system drainage, which contributes to steady corrosion of the flow passages within the system.

In a prior application, U.S. Application Ser. No. 890,306 the inventor, Embree discloses, as FIG. 1, an arrangement of pipes connected into a sump tank to provide venting of the return pipe line from the solar collector and hence initiating automatic drain-back of the heat transport fluid into the sump tank when the circulating pump is de-energized. That disclosure was an improvement over prior art in that, except for the pump no moving mechanical parts (i.e. valves or flapper) were required in the system, and thus maximum reliability was achieved. In developing that system Embree experimented with and abandoned the use of a check valve as a combination vacuum break vent and bypass flow preventer because under certain conditions the check or flapper valve would fail to open, in effect being stuck in the closed position. The failure of the valve to open appeared to be caused either by water surface tension effects at the flapper valve or by a small particle of dirt or sludge causing the valve to stick. Only one such failure of the valve to open in cold weather could allow the collector and its piping to freeze and rupture; hence Embree's efforts to develop a drain-back system with no moving parts, which were successful and resulted in the reference application Ser. No. 890,306.

That prior disclosure and application Ser. No. 890,306 has two disadvantages in comparison to the present invention; firstly the assembly of pipes connected to and external to the sump tank was awkward and it was not always possible to find space enough to install the assembly, and additionally the pipe connections needed protection from damage in shipment; secondly under certain flow conditions an excess of pump head (otherwise desirable) can cause noisy bypass flow to occur through the "vacuum break section" of that device.

SUMMARY OF THE INVENTION

Accordingly, one object of this invention is to provide a novel solar heating system with reliable collector drainage during periods of cold temperature.

Another object of this invention is to provide a novel valveless solar collector drainage system for a solar heating system.

Yet another object of this invention is to provide a solar heating system capable of operating at elevated temperatures.

A further object of this invention is to provide a novel closed and pressurized solar heating system.

Another object of this invention is to provide a novel closed and pressurized solar heating system with improved solar collector drain-back.

Yet another object of this invention is to provide a novel solar heating system with a compact collector-draining sump tank requiring only two external connections.

A further object of this invention is to provide a sump tank and collector draining system which is insensitive to system pump head capacity and fluid flow rate over a range of variation.

These and other objects of the present invention are achieved by providing a closed pressurized solar heating system having a sump tank serving as a fluid reservoir, and a fluid circulating pump which circulates a heat transport fluid from the bottom of the sump tank to a heat exchanger. The heat transfer fluid, after passing through the heat exchanger is returned to the collector through a collector supply line, where it is re-heated and returned to the top of the sump tank through a collector return line.

During operation the sump tank is filled initially to a level intermediate between an opening at the top of the tank and another opening at the bottom of the tank, the system pump being connected to the bottom opening; The collector return line is connected to the top opening of the tank. The sump tank contains a novel vented internal pipe conveying the transport fluid from the collector return line and extending from the top opening of the tank down to below the operating level of the transport fluid, which is lower than the initial fill level because of the displacement of the amount of fluid required to fill the collector and lines above the initial fill level. Drain back automatically occurs upon de-energization of the system pump, whereupon air from the upper part of the sump tank enters a vent hole in the sump tank internal pipe, breaking the vacuum existing in the return flow path from the collector, and initiating fluid return from the collector to the sump tank, which continues until the fluid level within the sump tank returns to the initial fill level or to a slightly higher level because of thermal expansion of the fluid. The sump tank internal pipe is enclosed coaxially by a novel second pipe which captures any spill flow issuing frm the vent hole, assuring quiet operation with a minimum of splashing over a wide range of possible flow rates, thereby making the pump head capacity and the vertical elevation of the sump tank less critical.

Specificembodiments include several variations of the sump tank internal pipe assembly, but each providing valveless collector drain back.

BRIEF DESCRIPTION OF THE DRAWINGS

A more complete appreciation of the invention and many of the attendant advantages thereof will readily be obtained as the same becomes better understood by reference to the following detailed description when considered in connection with the accompanying drawings, wherein.

DETAILED DESCRIPTION OF THE PREFERRED EMBODIMENTS

Figure 1:
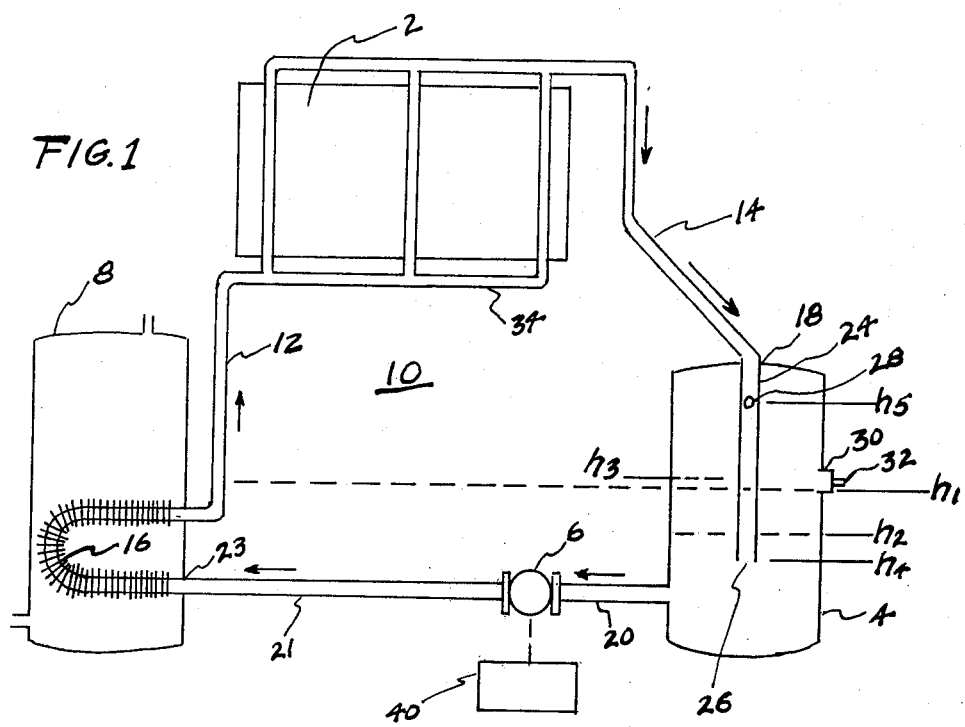
FIG. 1 is a schematic diagram of a closed pressurized solar heating system utilizing valveless collector drainback according to the present invention.

Referring now to the drawings, wherein like reference designate identical or corresponding parts throughout the several views, and more particularly to FIG. 1 thereof, the solar heating system 10 is generally seen to include a solar collector 2, a sump tank 4, a system pump 6, and a heat exchanger tank 8. The pump 6 is connected to the collector 2 through the collector supply line 12, and the collector is likewise connected to the sump tank 4 by means of the collector return line 4. The supply line 12 includes a heat exchanger section generally labeled as 16, within the heat exchange tank 8, which is provided with external fins in order to transfer heat from the circulating heat transport fluid, i.e. water, to the fluid inside the heat exchange tank 8. Thus the heat exchange tank 8 serves to store heat collected at the solar heating collector.

The solar collector 2 may include a single energy collecting unit, or a plurality of such units connected in serial and parallel fluid combination. However, each collector forming the collector 2 includes a plurality of vertically disposed fluid circulation tubes connected by means of collector headers (not shown). Therefore, flow through the collector 2 is generally in a vertical direction, and any horizontal collector header piping is provided with a slight backslope and the collector supply and return lines 12 and 14 are also sloped to assure complete drain down of the collector 2 and its piping by means which are fully described below.

As seen in FIG. 1, the collector return line 14 is connected to the inlet 18 at the top of the sump tank 4, and the pump inlet line 20 is connected to the outlet 22 at or near the bottom of the sump tank 4. The sump tank 4 is constructed with an internal central flow pipe 24 extending downward from the tank inlet 18 with its bottom opening 26 at a height $h_4$ below the operating level $h_2$ of the heat transport fluid within sump tank 4. The internal pipe 24 is provided with a vent hole 28 at height $h_5$, above the initial fluid fill level $h_1$ and above the drained-down thermally-expanded fluid level $h_3$ and well above the operating fluid level $h_2$. The levels $h_1$ through $h_5$ are referenced against the ground plane.

Also as shown schematically in FIG. 1 are the sump tank fill plug 30 and the electronic controller 40. The controller 40 senses a temperature differential between the solar collector 2 and the heat exchanger 16. When this temperature differential exceeds a preset maximum of about 7 degrees C., the controller 40 supplies electric power to the system pump 6 which draws water from the sump tank 4 and pumps this water through the heat exchanger 16 and thence through the collector supply line 12 and up to the top of the collector 2 where the water is heated as the result of impinging solar energy. From the collector 2, the heated water is pumped down the return line 14, through the inlet 18 of the sump tank 4 and down through the internal central flow pipe 24 to exit at the bottom 26 of internal pipe 24 at level $h_4$ below the operating level $h_2$ of the transport fluid, water. As the supply line 12, the solar collector 2 and the return line 14 fill with water, air is dumped into the sump tank 4, lowering the water level in sump tank 4 from the fill level $h_1$ to the operating level $h_2$. Since the level $h_2$ is above the bottom 26 of the internal pipe 24, quiet operation without splashing is assured except for some spillage of water through the vent hole 28, which spillage will be provided for by novel means shown in FIG. 2.

Agin referring to FIG. 1, drain-back of the solar collector occurs in the following manner: When the temperature differential between the solar collector 2 and the heat exchanger 16 drops back to a preset minimum of about 1 degree C., the electronic controller 40 cuts off power to the system pump 6. The internal volute chamber of the pump 6 has sufficient clearance so that the water flows freely through it when the pump is deenergized. Upon de-energization of the pump 6, circulation through the heating system ceases, the fluid static pressure head at the vent hole 28 in internal pipe 24 of the sump tank 4 becomes momentarily less that the air pressure in the sump tank above the operating level $h_2$ by the difference in head $h_5$ minus $h_2$, which would be the amount of vacuum or suction required to keep the water standing in the pipe. The vacuum is broken by the vent hole 28, thereby initiating drainage of the return line 14 and the solar collector 2. As drainage proceeds, the supply line 12 likewise commences draining through the volute chamber of the pump 6 into the sump tank 4. It is noted that drainage of the lower part of the return line 14 produces a siphoning effect with respect to water remaining in the collector 2 and the upper part of the return line 14, thereby hastening the overall system drain down. It is therefore seen that once drainage has been initiated in the return line 14, drainage continues, by a combination of siphoning and admittance of additional air from the sump tank 4, until the water level in the closed solar heating system 10 returns to $h_5$, which is higher than $h_1$ because of temperature expansion of the heated fluid. All piping above the level $h_2$, the operating water level within the sump tank 4, is installed with a back slope of at least 1/16th of an inch per foot in order to assure drainage.

As mentioned above, the solar heating system 10 is a closed system. Therefore no new air is introduced into the system during drain back, and the system is therefore less susceptible to corrosion of the flow passages. Also the fill plug 30 is fitted with an automobile tire type air valve 32 concentrically positioned within the fluid fill plug so that the solar heating system 10 can be pressurized lightly to avoid boiling and/or vaporization of the circulating water especially in the form of cavitation at the inlet of the circulating pump 6. In development tests it was found that pressurizing the system with air to about four pounds per square inch guage pressure through the air valve 32 when the water is at room temperature will keep the system from boiling even when the water temperature in the collector rises to 240 degrees F. As the water temperature rises the air pressure in the sump tank 4 also rises, thereby preventing boiling. A further advantage of the ability to pressurize the system through the air valve 32 is in the convenience of being able to pressure check the system for leaks on first installing the system.

In installation, the sump tank 4, which is about two feet tall, is placed in a non-freezing location at as great a height as can conveniently be managed below the bottom manifold of the solar collector 2, in order to minimize the pump start-up lifting head required. The heat exchange tank 8 can be located near the sump tank 4 or can be located remotely well below the sump tank, typically on the basement floor. The system pump 6 can be located anywhere that is convenient between the outlet 22 of the sump tank 4 and the inlet 23 of the heat exchanger 16, which is typically a coil of finned copper tubing within the tank 8. The most convenient location for the pump 6 has been found to be directly before the inlet 23, which will normally be the lowest point in the system. The collector return line 14 and sump tank internal pipe 24 are constructed of smaller diameter piping, about ½ inch diameter, than the collector supply line 12, which is made of ¾ inch diameter pipe, as are also the pump inlet line 20 and the pump outlet line 21. The smaller diameter of the return line 14 helps assure that a low start-up flow carries all the air in the collector 2 and the return line 14 back to the sump tank 4. The circulating flow through the system increases as the air is brought down from the the return piping 14 into the sump tank 14, because the fluid in the return line balances the fluid in the collector supply line 12, and the pump head then works only against hydraulic flow friction instead of lifting head or gravity. The larger diameter of the collector supply line 12 and of the pump lines 20 and 21 helps to reduce the pumping friction head losses and helps thereby to increase the transport fluid flow rate, desirable to improve collector heat removal efficiency. The sump tank 4 can also be located well below the collector, such as on a basement floor near the heat exchanger 16, but a larger pump 6 may then be needed to provide sufficient start-up lifting head. The solar heating system 10 shown in FIG. 1 is designed for collector flows of from 2 to 5 gallons of water per minute and exhibits typical fill and drain times of 15 to 30 seconds, while the sump tank 4 has a capacity of five gallons.

Figure 2:
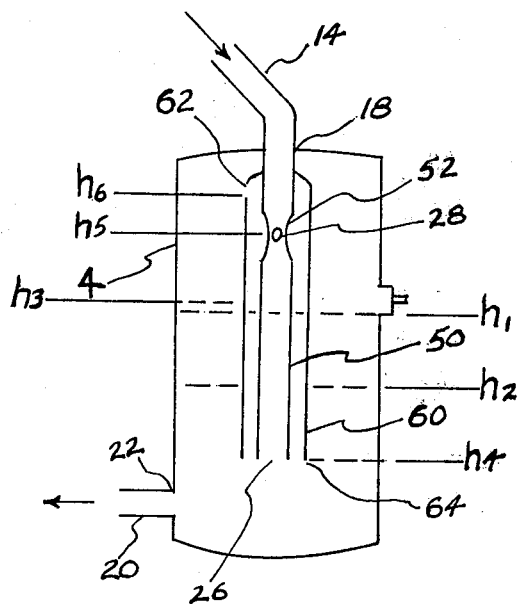
FIG. 2 is a schematic diagram of another embodiment of the sump tank of the system of FIG. 1, in which sump tank a coaxial pipe assembly is used.

Another and preferred embodiment of the sump tank 4 of the system shown in FIG. 1 is the sump tank of FIG. 2. As seen in FIG. 2, the collector return line 14 is connected to the inlet 18 at the top of the sump tank 4 and the pump inlet line 20 is connected to the outlet 22 at or near the bottom of the sump tank 4. The sump tank 4 is made with an internal pipe 50 extending downward from the tank inlet 18 with its bottom opening 26 at a height $h_4$ well below the operating level of the heat transport fluid within sump tank 4. The internal pipe 50 is made with a short constricted venturi section, at the narrowest part of which a vent hole 28 is provided at height $h_5$, above the initial fluid fill level $h_1$ and above the drained-down thermally expanded fluid level $h_3$ and well above the operating fluid level $h_2$. The purpose of the venturi section 52 is to reduce the fluid static pressure at the vent hole 28 and thereby to reduce the amount of spill flow issuing from the vent hole 28 during normal operation of the pump 6 while solar heat is being collected. Thus the internal pipe 50, although similar to the internal pipe 24 of FIG. 1, is appropriate for higher flow rates and a larger solar collector 2 than the internal pipe 24 of FIG. 1, because of the effect of the venturi section in reducing spill flow rates.

In order to capture any spill flow issuing from the vent hole 28 and to cause that spill flow quietly down to the operating surface of the transport fluid at level $h_2$, as shown in FIG. 2 the internal pipe 50 is within and surrounded coaxially by a pipe 60 having an opening 62 at a height $h_6$ slightly higher than the vent hole 28. The bottom 64 of pipe 60 is open and also extends below the operating fluid level $h_2$. When the pump 6 is energized, air from within the sump tank 4 enters the opening 62 in pipe 60 and thence enters the vent hole 28 in internal pipe 50, breaking the vacuum in internal pipe 50 and in the collector return line 14 and commencing drain down of the collector. The internal pipe 50 can be of nominal diameter ½ inch and the surrounding pipe 60 can be of nominal diameter ¾ inch. This arrangement was found to provide sufficient clearance both for proper venting and to accomodate the spill flow. The holes 28 and 62 can be about ¼ inch in diameter which was found fully adequate to admit air for drainback.

Figure 3:
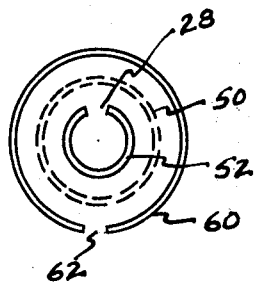
FIG. 3 is a view of the cross-section of a venturi in the internal pipe of the embodiment of the sump tank shown in FIG. 2.

In order more fully to illustrate the internal pipe assembly of the sump tank 4 of FIG. 2, in FIG. 3 is shown a cross-sectional representation of the internal coaxial pipe assembly of FIG. 2, taken through the height $h_5$ at the location of the narrow portion of the venturi 52 and at the location of the vent hole 28. The radial clearance between pipes 50 and 60 accomodates both the spill flow during pump operation and the air flow into the vent hole 28, in the reverse direction from the spill flow, during drainback.

Figure 4:
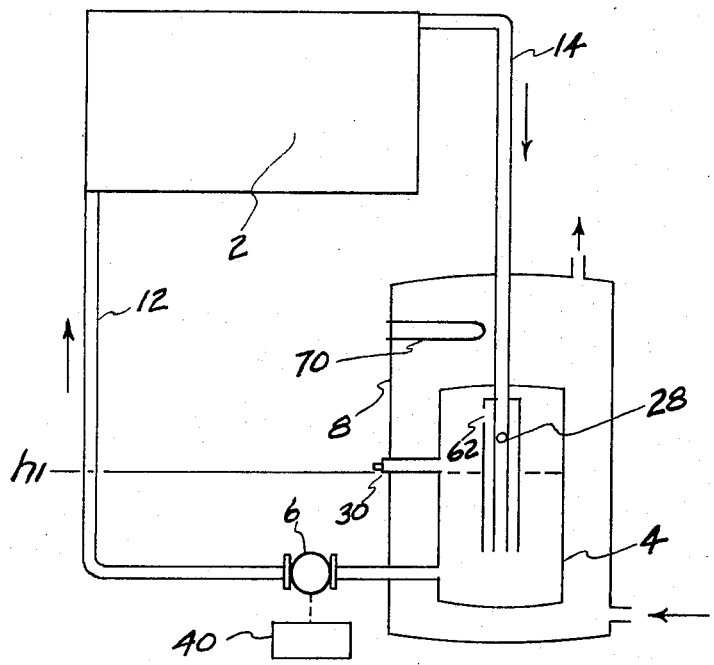
FIG. 4 is a schematic diagram of a closed pressurized heating system similar to the system of FIG. 1 except wherein the sump tank itself becomes the heat exchanger within a larger second tank, thereby eliminating a separate heat exchanger section.

FIG. 4 shows schematically a closed pressurized solar heating system incorporating means for eliminating the separate heat exchanger section 16 within the heat exchanger tank 8 of FIG. 1 while retaining essentially the same drain down and operating features. In FIG. 4 the sump tank 4, constructed like the sump tank of FIG. 1 or of FIG. 2, is placed within the heat exchanger tank 8, whereby the external surface of the sump tank 4 becomes the means of heat transfer between the heat transport fluid and the fluid within the heat exchanger tank 8. Three advantages of the system of FIG. 4 are firstly the reduction of fluid flow friction losses by elimination of the heat exchanger section 16, secondly the simplification of installation, and thirdly the elimination of the requirement for separate thermal insulation on the sump tank 4. An auxiliary electric heating element 70 can be inserted in heat exchanger tank 8 for use in times of low solar thermal inputs.

Figure 5:
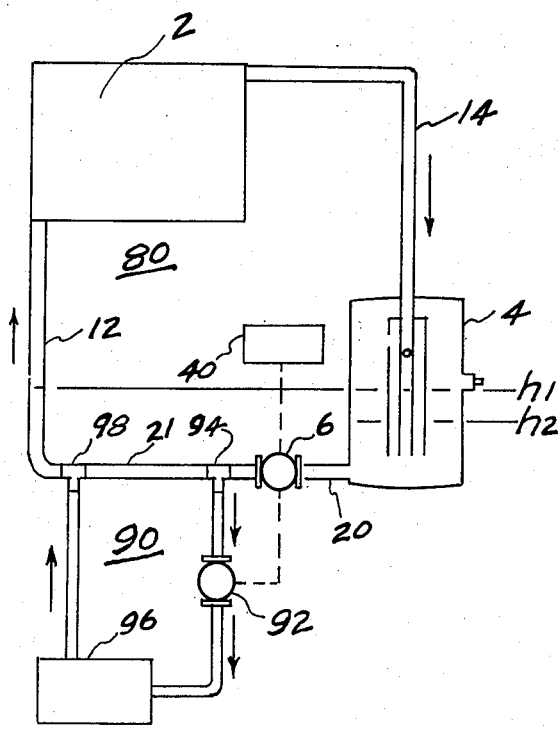
FIG. 5 is a schematic diagram of a closed pressurized solar heating system having a primary, drainable solar collector flow loop and a heat exchanger means consisting of a secondary flow loop for transporting heat to devices outside of or remote from the primary loop.

FIG. 5 shows a closed pressurized heating system having a primary drainable collector flow loop 80 and a heat exchanger section consisting of a secondary flow loop 90 for transporting heat to devices outside of or remote from the primary loop. The secondary flow loop 90 must be below the operating fluid level $h_2$ in the sump tank 4 in a non-freezing location or must otherwise be kept primed with fluid and kept from freezing. In the primary flow loop 80, the circulating pump 6, activated by the controller 40, draws the heat transport fluid from the sump tank 4 and circulates it up through the collector supply line 12, the solar collector 2, and back to the sump tank 4 through the collector return line 14. When circulating pump 6 is turned off by the controller 40, drain-back of the transport fluid from the collector 2 and the supply and return lines 12 and 14 occurs as previously described. Simultaneously with the activating of pump 6, or as otherwise activated by the controller 40, a second circulating pump 92 in the secondary flow loop 90 draws transport fluid from the outlet line 21 from pump 6 at a tee pipe connection 94, pumps it through device 96 which may be for example a remote tank or heat exchanger, and back to the pump outlet line 21 through the tee pipe connection 98. The tee connection 98 is downstream from the tee connection 94 along the pump outlet line 21 in the primary, drainable flow loop 80. By principles well known in the hot water or hydronic heating art the secondary flow loop 90 can remove heat energy from the primary flow loop 80 while producing little or no effect on the flow rate in the primary flow loop 80. The system of FIG. 5 is useful in cases when it is desirable or advantageous to minimize the head capacity of the pump 6 and when it is desirable to minimize the weight of the portion of the solar heating system which is supported in the higher or upper part of a building.

Figure 6:
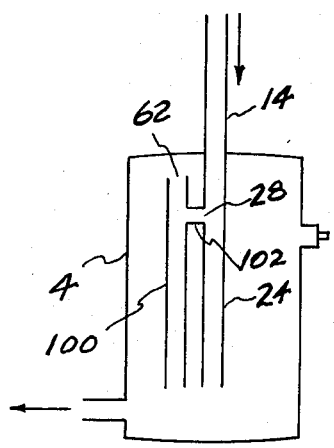
FIG. 6 is a diagram of a sump tank similar to those in FIGS. 4 and 5, except that the sump tank internal pipe assembly consists of two pipes which are located side-by-side instead of coaxially.

In order further clarify the operating principle of the internal pipe assembly of the sump tank 4, in FIG. 6 is diagrammatically shown an embodiment of the internal pipe assembly of FIGS. 4 and 5, except that instead of having two concentric pipes, two pipes side-by-side in parallel, pipes 24 and 100 are shown. Pipe 24 is the central flow pipe carrying the main volume of flow from the collector return line 14 into the sump tank 4. Some spillage or secondary flow will occur out through vent hole 28 in pipe 24 because of excess static pressure within the pipe 24 during normal operation of the system. The purpose of pipe 100 is to convey the spill flow quietly down to the operating fluid level $h_2$ while not interfering with the flow of air into vent hole 28, which initiates drain-back when the system pump 6 is turned off by the controller 40. Although flow down through pipe 24 could be balanced by placing and adjusting a restriction (not shown) in the collector supply line 22, adjusting that restriction so that the flow static pressure at vent hole 28 is just equal to the air static pressure in the top of sump tank 4, thus creating a balance so that no spill flow exits from vent hole 28, it is more convenient to allow the spill flow to occur and to then use means such as pipe 100 to quiet the spill flow, thus making the system tolerant of a wider range of pump head capacities and making the elevation of the sump tank 4 non-critical. It is very desirable to quiet the spill flow especially for residential heating applications where a noisy system is objectionable.

Figure 7:
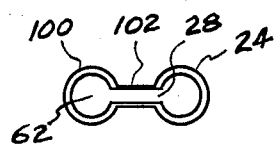
FIG. 7 is a view of the cross-section of the sump tank internal pipe assembly of FIG. 6 taken at the location of the vent hole 28.

FIG. 7 shows a cross-section view through the pipes 24 and 100 of FIG. 6, taken at the location of the vent hole 28. The cross-connecting pipe can be made very short or eliminated, putting the two pipes right next to each other, but the coaxial embodiment of the principle, as shown in FIGS. 2, 3, 4, and 5 is preferred for ease of construction and assembly.

Obviously, numerous modifications and variations of the present invention are possible in light of the above teachings. One such modification is the substitution of other drainable devices, such as a drainable heat exchanger in place of the solar collectors herein shown, in order to utilize the filling and draining features of the present invention with such devices. Furthermore, the filling and drain-back features of the invention are generally applicable to any fluid circulation system wherein fluid circulates between one container and a second elevated container. It is therefore understood that within the scope of the appended claims, the invention may be practiced otherwise than as specifically described herein.

What is claimed as new and desired to be secured by Letters Patent of the United States is:

1. A closed solar heating system wherein a heat transport fluid is forced to circulate between a solar collector, having an input port and an output port, and a heat exchanger means, said transport fluid absorbing heat produced by solar energy impinging upon said solar collector, releasing absorbed heat to said heat exchanger means, and recirculating through said solar collector, comprising:

a sump tank serving as a reservoir for said transport fluid, said sump tank having a top opening and a bottom opening;

a system pump having an input port in fluid connection with said bottom opening of said sump tank and having an output port in fluid connection with collector supply line means, said system pump forcing the circulation of said transfer fluid;

collector supply line means connected to said output port of said system pump and coupled through said heat exchanger means to said input port of said solar collector, for providing a supply flow path from said pump through said heat exchanger means to said solar collector;

collector return line means for coupling said output port of said solar collector to said top opening of said sump tank;

system controller means coupled to said system pump for controlling the operation of said pump in accordance with predetermined temperature differentials existing within said solar heating system;

said sump tank initially filled with said transport fluid to an initial fill level at a first height between said top opening and said bottom opening of said sump tank, said transport fluid returning essentially to said initial fill level at said first height, upon drain back of said solar collector; said transport fluid lowering, when said pump is pumping, to an operating level within said sump tank at a second height below said first height;

said sump tank having an internal pipe conveying the flow from said collector return line and extending downward from said top opening in said sump tank to a third height within said sump tank, said third height being below said second height transport fluid operating level, said internal pipe in fluid connection with vacuum break means within said sump tank at a fourth height between said top opening of said sump tank and said first height initial fill level; whereby de-energization of said system pump by said controller means produces a cessation of circulation of said transport fluid, causing air from within said sump tank to enter said internal pipe through said vacuum break means, breaking the vacuum in said return line means and commencing drain-back of said solar collector.

2. A closed solar heating system according to claim 1, wherein;

said vacuum break means consists of a vent hole at said fourth height in the side of said internal pipe.

3. A closed solar heating system according to claim 2, wherein:

said internal pipe having a first diameter within said sump tank is within and surrounded coaxially by a second pipe having a second diameter greater than said first diameter, a top opening in said second pipe being at a height higher than said vent hole and the bottom of said second pipe being open and extending below said second height transport fluid operating level;

whereby secondary or spill flow of transport fluid from said vent hole occurring when said pump is pumping is captured and caused to flow quietly down to the surface or operating level of said transport fluid at said second height within said sump tank, and whereby when said pump is de-energized, air from within said sump tank enters said top opening in said second pipe and thence enters said vacuum break vent hole in said internal pipe, breaking the vacuum in said return line means, and commencing drain-back of said solar collector.

4. A closed solar heating system according to claim 2, wherein said vent hole in said internal pipe within said sump tank is in fluid connection with the interior of a second pipe within said sump tank, said second pipe having a top opening at a height higher than said vent hole and said second pipe having a bottom opening below said second height operating level; said second pipe forming a conduit for spill flow from said vent hole to convey said spill flow down to said operating level of said transport fluid, for the purpose of decreasing the sound and splash of said spill flow;

whereby when said pump is de-energized, air from within said sump tank enters said top opening in said second pipe and thence enters said vacuum break vent hole in said internal pipe, breaking the vacuum in said return line means and commencing drain-back of said solar collector.

5. A closed solar heating system according to claim 2, wherein said internal pipe contains a constricted, venturi section at which said vent hole is located, thereby reducing fluid static pressure at said vent hole and thereby reducing the amount of spill flow issuing from said vent hole when said pump is energized.

6. A closed solar heating system according to claim 3, wherein said internal pipe having a first diameter contains a constricted, venturi section at which said vent hole is located, thereby reducing fluid static pressure at said vent hole and thereby reducing the amount of spill flow issuing from said vent hole when said pump is energized.

7. A closed solar heating system according to claim 1, wherein said heat exchanger means consists of a coil of finned tubing within a tank.

8. A closed solar heating system according to claim 1, wherein said heat exchanger means consists of a secondary flow loop comprised of a heat exchanger and a second circulating pump, a first tee pipe connection in said collector supply line means, a first pipe section connecting said first tee to the input port of said second circulating pump, a second pipe section connecting the output port of said second circulating pump to the input port of said heat exchanger, and a third pipe section connecting the output port of said heat exchanger to a second tee pipe connection in said collector supply line means downstream of said first tee pipe connection.

9. A closed solar heating system according to claim 1, wherein said heat exchanger means consists of a shell and tube heat exchanger.

10. A closed solar heating system according to claim 1, further comprising:

pressurization means for pressurizing said solar heating system at a pressure above atmosphere.

11. A closed solar heating system wherein a heat transport fluid is forced to circulate between a solar collector, having an input port and an output port, and a heat exchanger means, said transport fluid absorbing heat produced by solar energy impinging upon said solar collector, releasing absorbed heat to said heat exchanger means, and recirculating through said solar collector, comprising;
- a sump tank serving as a reservoir for said transport fluid, said sump tank having a top opening and a bottom opening;
- a system pump having an input port in fluid connection with said bottom opening of said sump tank and having an output port in fluid connection with collector supply line means connecting said output port of said system pump to said input port of said solar collector, said system pump forcing the circulation of said transport fluid between said solar collector and said heat exchanger means;
- collector return line means for coupling said output port of said solar collector to said top opening of said sump tank;
- said heat exchanger means being comprised of a second tank larger than said sump tank and having an input port and an output port, said sump tank being fully contained within said second tank; said output port of said sump tank connecting to said input port of said system pump by means of a pipe passing through the wall of said second tank, said collector return line means also passing through the wall of said second tank to connect to said top opening of said sump tank, the wall of said sump tank comprising the heat exchange transfer surface transferring solar heat outward from said trasport fluid in said sump tank to fluid contained within said second tank;
- said sump tank initially filled with said transport fluid to an initial fill level at a first height between said top opening and said bottom opening of said sump tank, said transport fluid returning essentially to said initial fill level at said first height, upon drain back of said solar collector; said transport fluid lowering, when said pump is pumping, to an operating level within said sump tank at a second height below said first height;
- said sump tank having an internal pipe conveying the flow from said collector return line and extending downward from said top opening in said sump tank to a third height within said sump tank, said third height being below said second height transport fluid operating level, said internal pipe in fluid connection with vacuum break means within said sump tank at a fourth height between said top opening of said sump tank and said first height initial fill level;
- whereby de-energization of said system pump by said controller means produces a cessation of circulation of said transport fluid, causing air from within said sump tank to enter said internal pipe through said vacuum break means, breaking the vacuum in said return line means and commencing drain-back of said solar collector.

12. In a closed fluid circulating system wherein a fluid is circulated through a supply line from a first container to an elevated second container, said second container having an input port and an output port, and returned to said first container through a return line, said system having a system pump connected in series with said supply line and forcing circulation of said fluid, and a system controller connected to said pump to control the operation of said pump in accordance with detected system parameters, the improvement comprising:
- a first container consisting of a sump tank serving as a reservoir for said fluid, said sump tank having a top opening and a bottom opening;
- said system pump having an input port in fluid connection with said bottom opening of said sump tank and having an output port in fluid connection with container supply line means connecting said output port of said system pump to said input port of said second container;
- said output port of said second container in fluid connection with said top opening of said sump tank through said return line;
- said sump tank initially filled with said fluid to an initial fill level at a first height between said top opening and said bottom opening of said sump tank, said system initially filled with air above said initial fill height, said fluid returning essentially to said initial fill level at said first height, upon drain-back of said container; said fluid lowering, when said pump is pumping, to a fluid operating level within said sump tank at a second height below said first height;
- said sump tank having an internal pipe conveying the flow from said return line and extending downward from said top opening in said sump tank to a third height within said sump tank, said third height being below said second height fluid operating level, said internal pipe in fluid connection with vacuum break means within said sump tank at a fourth height between said top opening of said sump tank and said first height initial fill level;
- whereby de-energization of said pump by said controller produces a cessation of circulation of said fluid, causing air from within said sump tank to enter said internal pipe through said vacuum break means, breaking the vacuum in said return line and commencing drain-back of said second container.

* * * * *